US010740029B2

(12) United States Patent
Loh et al.

(10) Patent No.: US 10,740,029 B2
(45) Date of Patent: Aug. 11, 2020

(54) EXPANDABLE BUFFER FOR MEMORY TRANSACTIONS

(71) Applicant: ADVANCED MICRO DEVICES, INC., Santa Clara, CA (US)

(72) Inventors: Gabriel H. Loh, Bellevue, WA (US); William L. Walker, Fort Collins, CO (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 142 days.

(21) Appl. No.: 15/824,539

(22) Filed: Nov. 28, 2017

(65) Prior Publication Data

US 2019/0163394 A1 May 30, 2019

(51) Int. Cl.
| | |
|---|---|
| *G06F 9/46* | (2006.01) |
| *G06F 3/06* | (2006.01) |
| *G06F 13/16* | (2006.01) |
| *G06F 12/0888* | (2016.01) |
| *G06F 12/0875* | (2016.01) |
| *G06F 12/0871* | (2016.01) |
| *G06F 12/02* | (2006.01) |

(52) U.S. Cl.
CPC .......... *G06F 3/0656* (2013.01); *G06F 3/0631* (2013.01); *G06F 3/0659* (2013.01); *G06F 9/466* (2013.01); *G06F 12/0246* (2013.01); *G06F 13/1642* (2013.01); *G06F 13/1673* (2013.01)

(58) Field of Classification Search
CPC ............... G06F 3/0656; G06F 13/1642; G06F 13/1673; G06F 12/0246; G06F 3/0631; G06F 3/0659; G06F 9/466
See application file for complete search history.

(56) References Cited

U.S. PATENT DOCUMENTS

| | | | | |
|---|---|---|---|---|
| 5,513,134 | A * | 4/1996 | Cooperman | ........ H04L 12/5601 365/189.04 |
| 6,362,993 | B1 * | 3/2002 | Henderson | ........... G11C 7/1075 365/189.07 |
| 6,877,077 | B2 * | 4/2005 | McGee | ............... G06F 13/1642 710/39 |

(Continued)

OTHER PUBLICATIONS

Alvin R. Lebeck, et al., A Large, Fast Instruction Window for Tolerating Cache Misses, Annual International Symposium on Computer Architecture Proceedings, May 25-29, 2002, IEEE. Anchorage, AK, USA, 12 pages.

(Continued)

*Primary Examiner* — Christopher D Birkhimer (57) ABSTRACT

A processing system employs an expandable memory buffer that supports enlarging the memory buffer when the processing system generates a large number of long latency memory transactions. The hybrid structure of the memory buffer allows a memory controller of the processing system to store a larger number of memory transactions while still maintaining adequate transaction throughput and also ensuring a relatively small buffer footprint and power consumption. Further, the hybrid structure allows different portions of the buffer to be placed on separate integrated circuit dies, which in turn allows the memory controller to be used in a wide variety of integrated circuit configurations, including configurations that use only one portion of the memory buffer.

20 Claims, 9 Drawing Sheets

(56) References Cited

U.S. PATENT DOCUMENTS

| | | | | |
|---|---|---|---|---|
| 7,380,097 | B2* | 5/2008 | Doi | G06F 12/1027 |
| | | | | 711/207 |
| 7,543,119 | B2* | 6/2009 | Hessel | G06F 9/30036 |
| | | | | 711/154 |
| 7,865,747 | B2* | 1/2011 | Buyuktosunoglu | G06F 1/3203 |
| | | | | 713/320 |
| 8,773,909 | B2* | 7/2014 | Li | G11C 16/22 |
| | | | | 365/185.17 |
| 8,780,632 | B2* | 7/2014 | Sprouse | G06F 12/0246 |
| | | | | 365/185.17 |
| 8,780,633 | B2* | 7/2014 | Sprouse | G06F 12/0246 |
| | | | | 365/185.17 |
| 8,780,634 | B2* | 7/2014 | Li | G11C 15/046 |
| | | | | 365/185.17 |
| 8,780,635 | B2* | 7/2014 | Li | G11C 16/08 |
| | | | | 365/185.17 |
| 8,792,279 | B2* | 7/2014 | Li | G06F 12/0246 |
| | | | | 365/185.17 |
| 8,811,085 | B2* | 8/2014 | Sprouse | G11C 15/046 |
| | | | | 365/185.17 |
| 8,817,541 | B2* | 8/2014 | Li | G06F 12/0246 |
| | | | | 365/185.17 |
| 9,098,403 | B2* | 8/2015 | Sprouse | G11C 11/5642 |
| 9,104,551 | B2* | 8/2015 | Sprouse | G11C 11/5642 |
| 9,116,796 | B2* | 8/2015 | Sprouse | G11C 11/5642 |
| 9,361,408 | B2* | 6/2016 | Marukame | G06F 16/164 |
| 2002/0051453 | A1* | 5/2002 | Heo | H04L 49/30 |
| | | | | 370/394 |
| 2002/0053038 | A1* | 5/2002 | Buyuktosunoglu | G06F 1/3203 |
| | | | | 713/320 |
| 2003/0110350 | A1* | 6/2003 | McGee | G06F 13/1642 |
| | | | | 711/108 |
| 2007/0255894 | A1* | 11/2007 | Hessel | G06F 9/30036 |
| | | | | 711/105 |
| 2009/0300323 | A1* | 12/2009 | Hessel | G06F 9/30036 |
| | | | | 712/7 |
| 2012/0311264 | A1* | 12/2012 | Wei | G06F 13/1673 |
| | | | | 711/118 |
| 2013/0013849 | A1* | 1/2013 | Varma | G06F 9/328 |
| | | | | 711/103 |
| 2013/0185496 | A1* | 7/2013 | Hessel | G06F 9/30036 |
| | | | | 711/105 |
| 2014/0136761 | A1* | 5/2014 | Li | G06F 12/0246 |
| | | | | 711/103 |
| 2014/0136762 | A1* | 5/2014 | Li | G06F 12/0246 |
| | | | | 711/103 |
| 2014/0136763 | A1* | 5/2014 | Li | G11C 16/22 |
| | | | | 711/103 |
| 2014/0136764 | A1* | 5/2014 | Li | G11C 16/08 |
| | | | | 711/103 |
| 2015/0074341 | A1* | 3/2015 | Marukame | G06F 12/0246 |
| | | | | 711/103 |
| 2015/0185816 | A1* | 7/2015 | Petrica | G06F 1/329 |
| | | | | 713/324 |
| 2017/0270988 | A1* | 9/2017 | Ikegami | G11C 11/1659 |

OTHER PUBLICATIONS

Edward Brekelbaum, et al., Hierarchical Scheduling Windows, 35th Annual IEE/ACM International Symposium on Microarchitecture, Nov. 18-22, 2002, Istanbul, Turkey, 10 pages.

* cited by examiner

EXPANDABLE BUFFER FOR MEMORY TRANSACTIONS

BACKGROUND

A processing system, such as those employed in computers, smartphones, and the like, includes at least one processor to execute sets of instructions (e.g., a computer program) to perform specified tasks and further includes one or more memory modules to store the data that is to be manipulated by the processor. Typically, the sets of instructions include one or more memory transactions (sometimes also referred to as memory requests), wherein each memory transaction stores or retrieves data at the memory modules. The efficiency with which the processing system can execute the memory transactions thus has a significant impact on the efficiency of the processing system as a whole. Accordingly, to facilitate execution of the memory transactions, the processing system can employ a memory controller that manages memory transaction execution. Conventionally, the memory controller includes a buffer that stores memory transactions that are awaiting completion at the memory modules. However, as the technologies of memory modules and processing systems continue to evolve, conventional memory buffer configurations are unlikely to support efficient processing of memory transactions. For example, conventional memory buffer configurations are likely to cause severe bottlenecks in processing systems employing memory modules using non-volatile memory and in processing systems employing Cache Coherency Interconnect for Accelerator (CCIX) or Gen-Z interconnects.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-12 illustrate techniques for employing an expandable memory buffer at a processing system, whereby the expandable memory buffer has a hybrid structure that supports enlarging the memory buffer when the processing system generates a large number of relatively high latency memory transactions. The hybrid structure allows a memory controller of the processing system to store a larger number of memory transactions than conventional approaches while still maintaining adequate transaction throughput and also ensuring a relatively small buffer footprint and power consumption. Further, the hybrid structure allows different portions of the buffer to be placed on separate integrated circuit dies, which in turn allows the memory controller to be used in a wide variety of integrated circuit configurations, including configurations that use only one portion of the memory buffer.

For example, in some embodiments the memory buffer employs both a content addressable memory (CAM) and a random access memory (RAM) buffer. The CAM supports relatively fast access to store and retrieve memory transactions, and therefore supports relatively low memory transaction latency. However, the CAM consumes a relatively high amount of power and circuit area. The RAM buffer, in contrast, consumes a relatively small amount of power and circuit area, but is relatively slow to access. By employing a hybrid structure in which the memory buffer includes both the CAM and the RAM buffer, the memory controller can maintain low memory transaction latency while storing a high number of memory transactions, and also consuming a relatively small amount of power and circuit area. The memory buffer is therefore suited for a wide variety of processing systems, including processing systems that generate a high amount of long latency memory transactions, such as processing systems that employ relatively slow memory modules (e.g., non-volatile memory modules), and processing systems that employ high latency interconnect protocols, such as CCIX and Gen-Z.

In addition, and as described further herein, the memory controller manages the hybrid structure of the memory buffer in any of a number of ways, allowing the memory buffer to be flexibly employed in a wide variety of processing systems and associated devices. For example, in some embodiments, the RAM buffer is an SRAM structure that the memory controller employs as an "annex" to the CAM, whereby the memory controller stores incoming memory transactions at the CAM until the CAM is full, and then stores additional incoming requests at the RAM buffer. In this configuration, the memory controller configures the RAM buffer as a first-in first-out queue (FIFO) that stores the incoming requests in order. As memory transactions are completed and discarded from the hybrid memory, the RAM buffer will be drained of memory transactions. For example, in some embodiments the memory controller first executes the memory transactions at the CAM, then selects (picks) for execution memory transactions at the RAM buffer in order, until the RAM buffer is empty. In other embodiments, as the memory controller frees up entries at the CAM (by selecting memory transactions at the CAM for execution), the memory controller transfers the oldest memory transactions from the RAM buffer to the CAM. Thus, in these embodiments, the memory controller does not select memory transactions for execution directly from the RAM buffer, but only from the CAM. In other embodiments, the memory controller stores only designated memory transactions at the RAM buffer, such as memory transactions having a low priority, an expected high latency, and the like.

Moreover, in some embodiments, the memory controller is configured to maintain memory coherence, and enhance processing efficiency, by matching incoming memory transactions to stored memory transactions that target the same memory address. The memory controller can thereby ensure that multiple memory accesses to the same memory location are executed in an expected order. To support matching the incoming memory transactions, the memory controller searches the hybrid memory buffer for memory transactions that match a received memory transaction. Because searching entries of the RAM buffer is a relatively slow process, the hybrid buffer can be configured in a variety of ways to reduce the number of entries of the RAM buffer that are searched, thereby improving overall memory access efficiency of the processing system. For example, in some embodiments where memory access requests are not required by the processing system to be stored in the order received, the memory controller prioritizes storing memory access requests at the CAM. The memory controller thereby maintains a relatively small number of memory transactions at the RAM buffer, improving search efficiency.

In other embodiments, the memory controller ensures the number of entries stored at the RAM buffer is relatively small by transferring memory transactions from the RAM buffer to the CAM. In particular, as entries of the CAM become available (e.g., when a memory transaction stored at the CAM is completed), the memory controller transfers memory access requests from the RAM buffer to the CAM. Thus, when a memory access request is received, any matching memory access request is more likely to be stored at the CAM, thereby reducing the search time to locate the matching memory access request. In some embodiments, the memory controller transfers memory transactions from the RAM buffer to the CAM based on the number of memory transactions stored at each module. For example, in at least one embodiment the memory controller monitors the number of free entries at the CAM and the number of used entries at the RAM buffer. In response to determining that the number of free entries at the CAM exceeds the number of used entries at the RAM buffer, the memory controller transfers the memory transactions at the RAM buffer to the CAM.

In still other embodiments, and as explained further herein, the memory controller is configured with one or more modules to simplify searching of the RAM buffer, such as a Bloom Filter that counts entries of the RAM buffer associated with memory address hashes, a tag array that stores memory address tags for the memory transactions stored at the RAM buffer (and can therefore be searched more quickly than the RAM buffer itself). In yet other embodiments, the RAM buffer itself is configured so that it can be searched relatively quickly, such as by partitioning the RAM buffer into multiple FIFO structures, with each FIFO structure associated with a different range of memory addresses.

Figure 1:
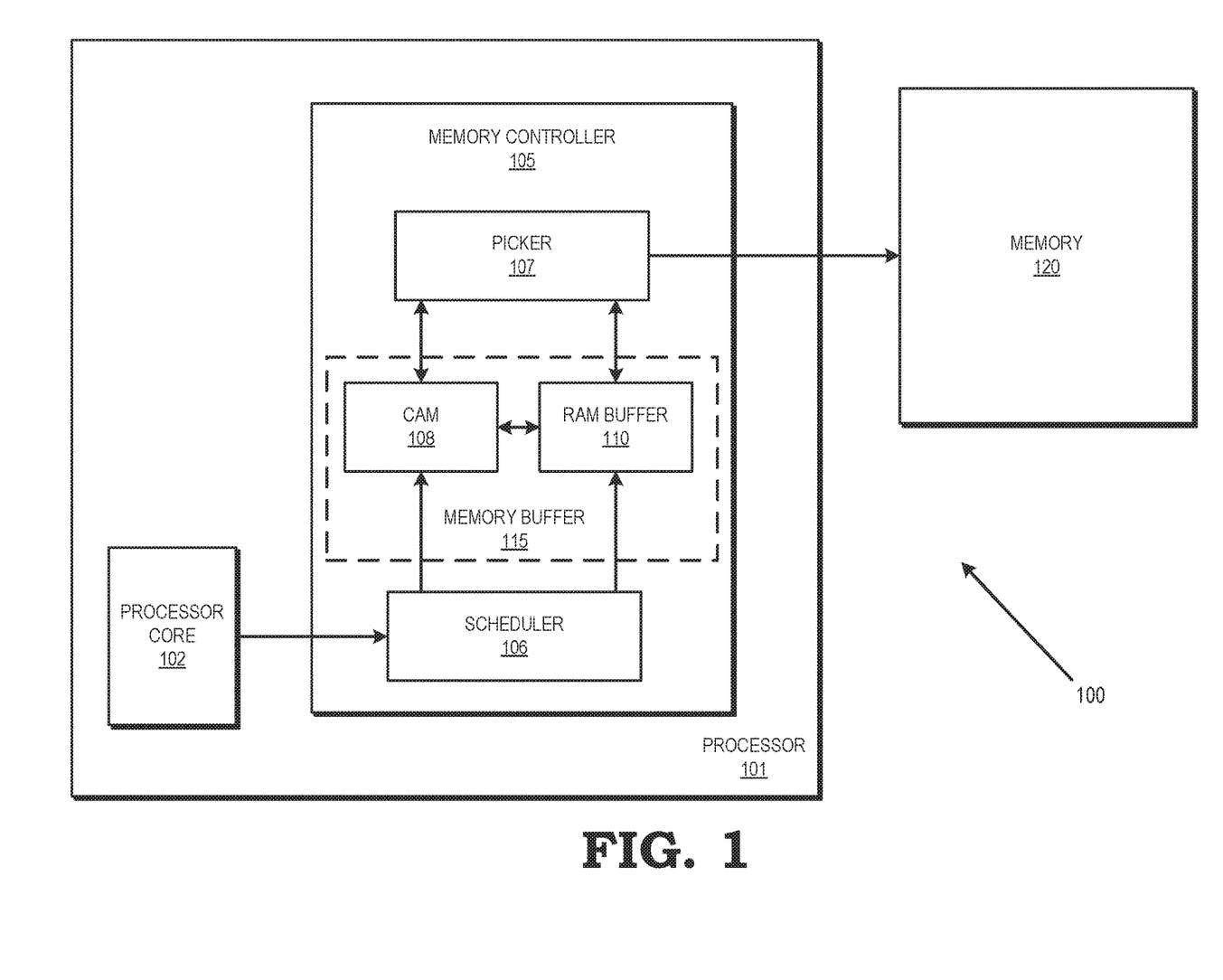
FIG. 1 is a block diagram of a processing system that employs a memory controller having an expandable memory buffer for memory transactions in accordance with some embodiments.

Turning to the figures, FIG. 1 illustrates a block diagram of a processing system 100 that employs an expandable hybrid memory buffer to store memory transactions in accordance with at least one embodiment. The processing system 100 can be incorporated into any of a number of electronic devices, such as a computer, tablet, smartphone, game console, and the like. As described further herein, the processing system 100 is generally configured to execute sets of instructions (e.g., computer programs) to carry out tasks specified by the instruction sets, including manipulation of data, control of one or more input/output devices (not shown), display of graphical information at a display device, and the like, or a combination thereof.

To facilitate execution of the sets of instructions, the processing system 100 includes a processor 101 and a memory 120. For the example of FIG. 1, it is assumed that the processor 101 is a general purpose processor that includes one or more processor cores (e.g., processor core 102), whereby each processor core includes at least one instruction pipeline generally configured to fetch instructions of the instruction set to be executed, dispatch operations based on the fetched instructions to one or more execution units, execute the operations at the execution units, and retire the fetched instructions upon completion of the associated operations. In addition, for the example of FIG. 1, it is assumed that the memory 120 includes one or more memory modules generally configured to store data on behalf of the processor 101. Each memory module includes multiple storage locations, referred to herein as entries, whereby each entry is associated with a corresponding memory address, thereby allowing the processor 101 to identify and access data at the individual entries. The memory modules of the memory 120 can therefore be any type of memory having addressable entries, such as RAM modules, non-volatile memory (NVM) modules (e.g., flash memory), and the like, or a combination thereof.

It will be appreciated that in some embodiments the processing system 100 includes additional modules and circuitry not specifically illustrated at FIG. 1. For example, in some embodiments the processing system 100 includes one more additional processors, processor cores, caches, input/output controllers, memory modules, and the like. In addition, in some embodiments the processing system 100 includes one or more interconnects to support communication of messages between system modules, such as a peripheral component interconnect express (PCI-E) interconnect, a CCIX interconnect, a Gen-Z interconnect, and the like, or a combination thereof.

Turning to the processor 101, as noted above the processor core 102 is generally configured to execute instructions. As is understood in the art, during execution of the instructions the processor core 102 generates operations, referred to herein as memory transactions, to access entries of the memory 120. Examples of such memory transactions include store operations (also referred to as write operations) to store data at the entry of the memory 120 associated with the store address of the store operation, and read operations to retrieve data from the entry of the memory 120 associated with the read address. To facilitate efficient execution of the memory transactions, the processor 101 includes a memory controller 105. The memory controller 105 is generally configured to manage communications between the processor core 102 and the memory 120, including receiving memory transactions from the processor core 102, buffering the received memory transactions, selecting the buffered memory transactions in an order specified by memory management policies associated with the processor 101, providing the selected memory transactions to the memory 120, and providing any response from the memory 120 (e.g. read data) to the processor core 102. It will be appreciated that while the example of FIG. 1 is described with respect to a single processor core 102 providing memory transactions, in some embodiments the memory controller 105 is configured to manage memory transactions provided by multiple processor cores or other modules of the processor 101.

To manage the receipt of memory transactions, as well as provision of the memory transactions to the memory 120, the memory controller 105 includes a scheduler 106, a picker 107 and a memory buffer 115. As used herein, provision of a memory transaction refers to providing the memory transaction to a memory via an interconnect (not shown). In the depicted example, the memory buffer 115 has a hybrid buffer structure that includes a CAM 108 and a RAM buffer 110. The scheduler 106 and picker 107 are configured to store and retrieve memory transactions from entries of the memory buffer 115 according to a specified memory management scheme associated with the processing system 100. For example, in some embodiments the memory controller 105 implements a strictly ordered memory management scheme, wherein memory transactions are provided to the memory 120 in the order they are received. Under such a strictly ordered scheme, the scheduler 106 receives memory transactions from the processor core 102 and stores the received transactions at the CAM 108 until there are no more entries of the CAM 108 to store memory transactions (i.e., until the CAM 108 is full). In response to determining that the CAM 108 is full, the scheduler 106 initiates storage of memory transactions at the RAM buffer 110. Further, the scheduler 106 does not resume storing memory transactions at the CAM 108 until all memory transactions stored at the RAM buffer 110 have been satisfied at the memory 120, thereby ensuring that the memory transactions are satisfied from the memory buffer 115 in the order received.

The picker 107 is configured to select memory transactions from the memory buffer 115, according to the specified memory management scheme, and provide the selected memory transactions to the memory 120 for satisfaction. Under the example embodiment of the strictly ordered scheme, the picker 107 is configured to initially select memory transactions from entries the CAM 108, in order, beginning at an initial designated entry of the CAM 108 and proceeding in order through the entries until the CAM 108 is empty. In response to determining that the CAM 108 is empty, the picker 107 proceeds to select memory transactions from the RAM buffer 110, in order, until the RAM buffer 110 is empty. The picker 107 then returns to selecting memory transactions from the CAM 108.

Figure 2:
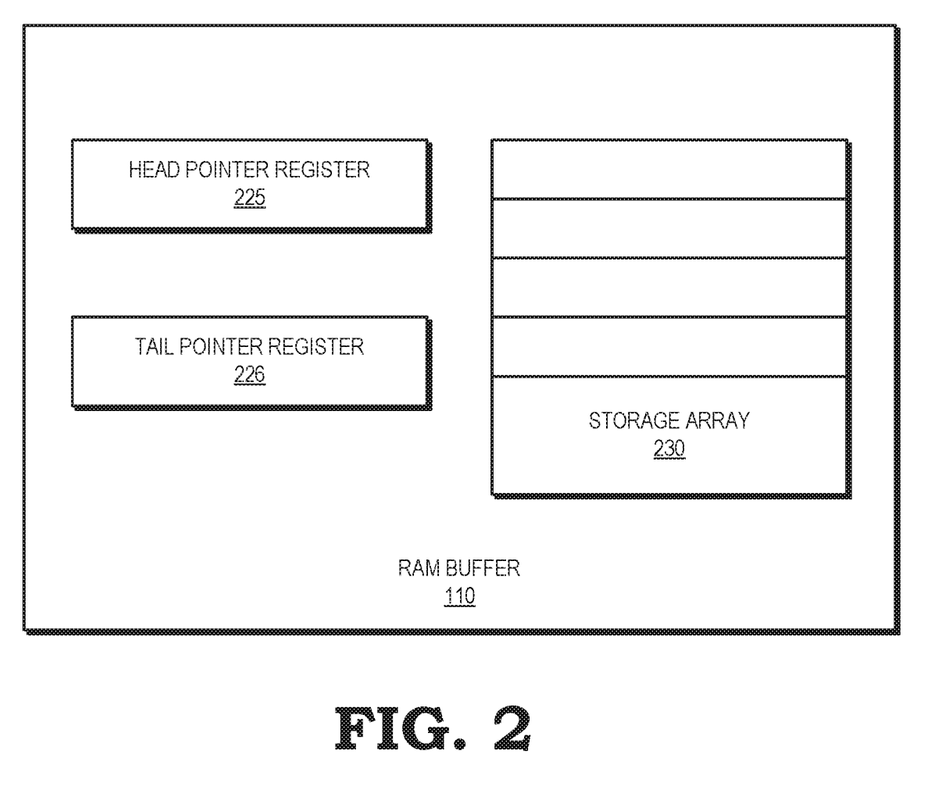
FIG. 2 is a block diagram of an example configuration of the expandable memory buffer of the memory buffer of FIG. 1 in accordance with some embodiments.

In some embodiments, to facilitate implementation of the strictly ordered scheme (as well as other memory management schemes), the RAM buffer 110 is configured to operate as a first-in first-out (FIFO) queue. An example configuration is illustrated at FIG. 2, which illustrates the RAM buffer 110 in accordance with some embodiments. In the illustrated example, the RAM buffer 110 includes a head pointer register 225, a tail pointer register 226, and a storage array 230. The storage array 230 includes a plurality of entries, with each entry associated with a different memory address and configured to store an individual memory transaction. The head pointer register 225 is configured to store the memory address (i.e. a pointer) of the entry of the storage array 230 that corresponds to the head of the FIFO queue, while the tail pointer register 226 stores a memory address of the entry of the storage array 230 that corresponds to the tail of the FIFO queue.

To store a memory transaction at the storage array 230, the scheduler 106 retrieves the memory address stored at the tail pointer register 226 and stores the memory transaction at the entry of the storage array 230 corresponding to the retrieved memory address. In addition, the scheduler 106 adjusts the address stored at the tail pointer register 226 to correspond to the next available entry of the storage array 230. To retrieve ("pick") a memory transaction from the RAM buffer 110 (e.g. after all entries of the CAM 108 have been picked), the picker 107 retrieves the memory address stored at the head pointer register 225 and reads the memory transaction from the entry of the storage array 230 corresponding to the retrieved memory address. In addition, the picker 107 adjusts the address stored at the tail pointer register 226 to correspond to the next entry, according to a specified order of entries, of the storage array 230. Thus, the scheduler 106 and the picker 107 together adjust the head pointer register 225 and tail pointer register 226 to maintain the FIFO structure at the storage array 230, which in turn supports rapid access of memory transactions at the RAM buffer 110. Such rapid access allows the memory controller 105 to employ the RAM buffer 110 as a supplemental buffer for the CAM 108, effectively enlarging the memory buffer 115 during periods of high memory activity while still maintaining relatively high transaction throughput.

Figure 3:
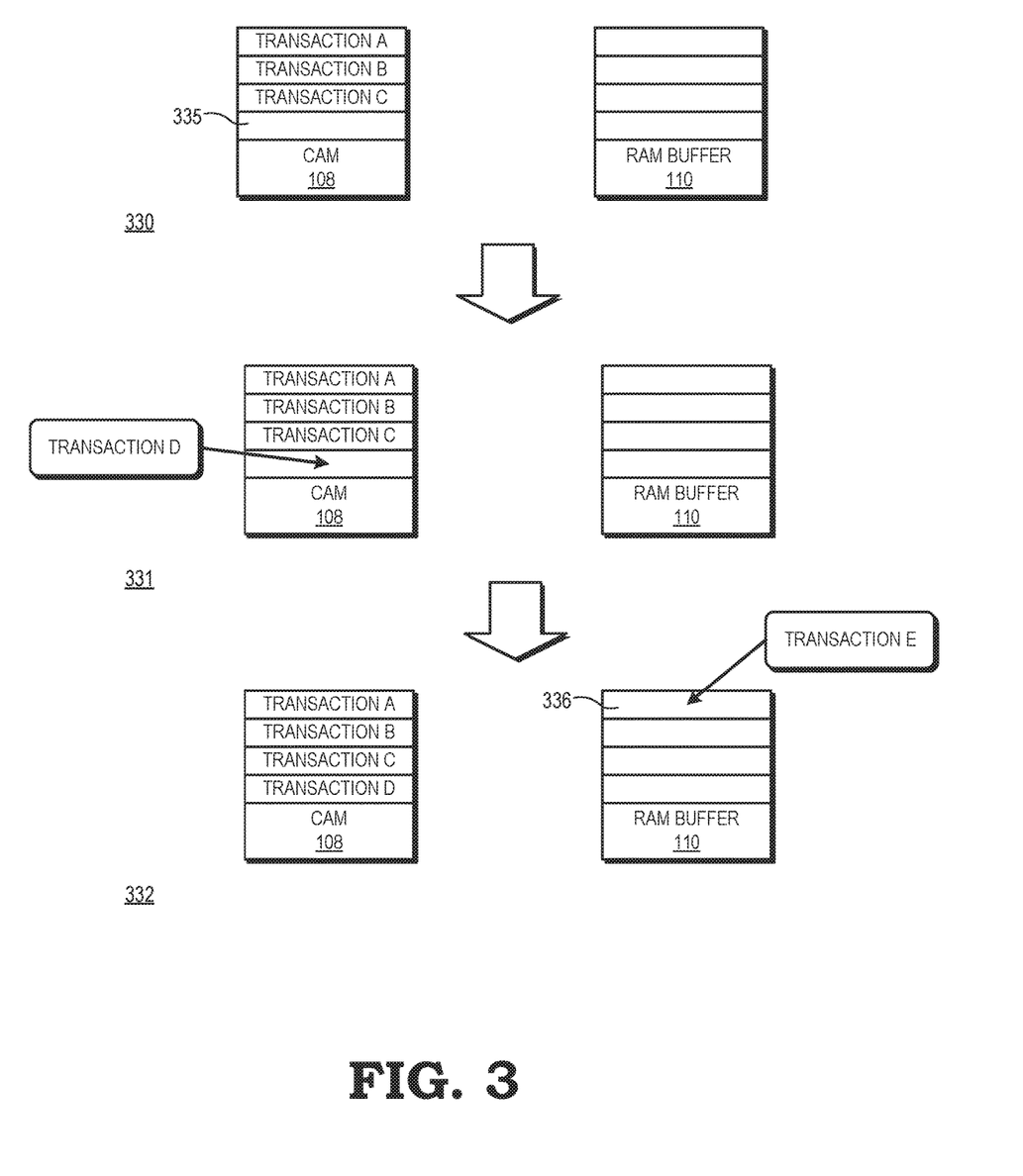
FIG. 3 is a diagram illustrating an example operation of the expandable memory buffer of FIG. 1 in accordance with some embodiments.

An example of the scheduler 106 implementing the strictly ordered scheme is illustrated at FIG. 3 in accordance with some embodiments. In the depicted example, the CAM 108 and RAM buffer 110 each have a capacity of four memory transactions. That is, each of the CAM 108 and RAM buffer 110 has four entries to store memory transactions. Further, in the illustrated example, at a time 330 the RAM buffer 110 is empty, and the CAM 108 stores three memory transactions designated Transaction A, Transaction B, and Transaction C. The CAM 108 therefore has one entry, designated entry 335, available to store a memory transaction.

At or around a later time 331, the scheduler 106 receives from the processor core 102 another memory transaction, designated Transaction D. In response, the scheduler 106 determines that entry 335 of CAM 108 is available, and therefore stores Transaction D at the entry 335. At or around a subsequent time 332, the scheduler 106 receives from the processor core 102 another memory transaction, designated Transaction E. In response, the scheduler 106 determines that the CAM 108 is full (i.e., that all of the entries of the CAM 108 store memory transactions that are awaiting satisfaction at the memory 120. In response, the scheduler stores Transaction E at an entry 336 of the RAM buffer 110.

It will be appreciated that in some embodiments the memory controller 105 employs the memory buffer 115 to implement memory management schemes other than the strictly ordered scheme. For example, in some embodiments the memory controller 105 implements a "dependency-ordered" management scheme, whereby the memory controller stores memory transactions that are independent of each other (that is, do not target the same memory address) in any order, but stores dependent memory transactions such that they are picked in the order received.

Under the dependency-ordered scheme, as well as a variety of other memory management schemes, the location of the memory buffer 115 where a received memory transaction is stored depends on whether the memory buffer 115 presently (at the time the memory transaction is received)

stores one or more memory transactions that target the same memory address as the received memory transaction. Accordingly, in some embodiments, in response to receiving a memory transaction, the scheduler 106 searches at least a subset of the entries of the memory buffer 115 to identify if any of the searched entries store a memory transaction that targets the same memory address as the memory address of the received memory transaction. For purposes of description, such entries are referred to as matching entries. Based on whether there are matching entries and the requirements of the memory management scheme, the scheduler 106 stores the memory transaction at a selected entry of the memory buffer 115. For example, under the dependency-ordered scheme, in response to identifying a matching entry, the scheduler 106 stores the memory transaction at an entry of the memory buffer 115 that the picker 107 will not select until after it has selected the matching entry.

For many configurations of the processing system 100, searching the CAM 108 for matching entries is a relatively fast process, while searching the RAM buffer 110 for matching entries is a relatively slow process. Accordingly, in some embodiments the memory controller 105 is configured in one of a number of different ways to reduce the number of entries of the RAM buffer 110 that are searched to identify matching entries. For example, in some embodiments, the RAM buffer 110 is configured to only store memory transactions that have already been selected by the picker 107, and are awaiting a response from the memory 120. For purposes of description, such memory transactions are referred to as "issued" memory transactions. Because issued memory transactions have already been selected, they do not need to be matched to received memory transactions, as the issued memory transactions will be completed at the memory 120 before the received memory transactions are picked. Thus, by storing only issued memory transactions at the RAM buffer 110, the memory buffer 115 is able to omit the RAM buffer 110 from matching entry searches, improving memory access efficiency.

Figure 4:
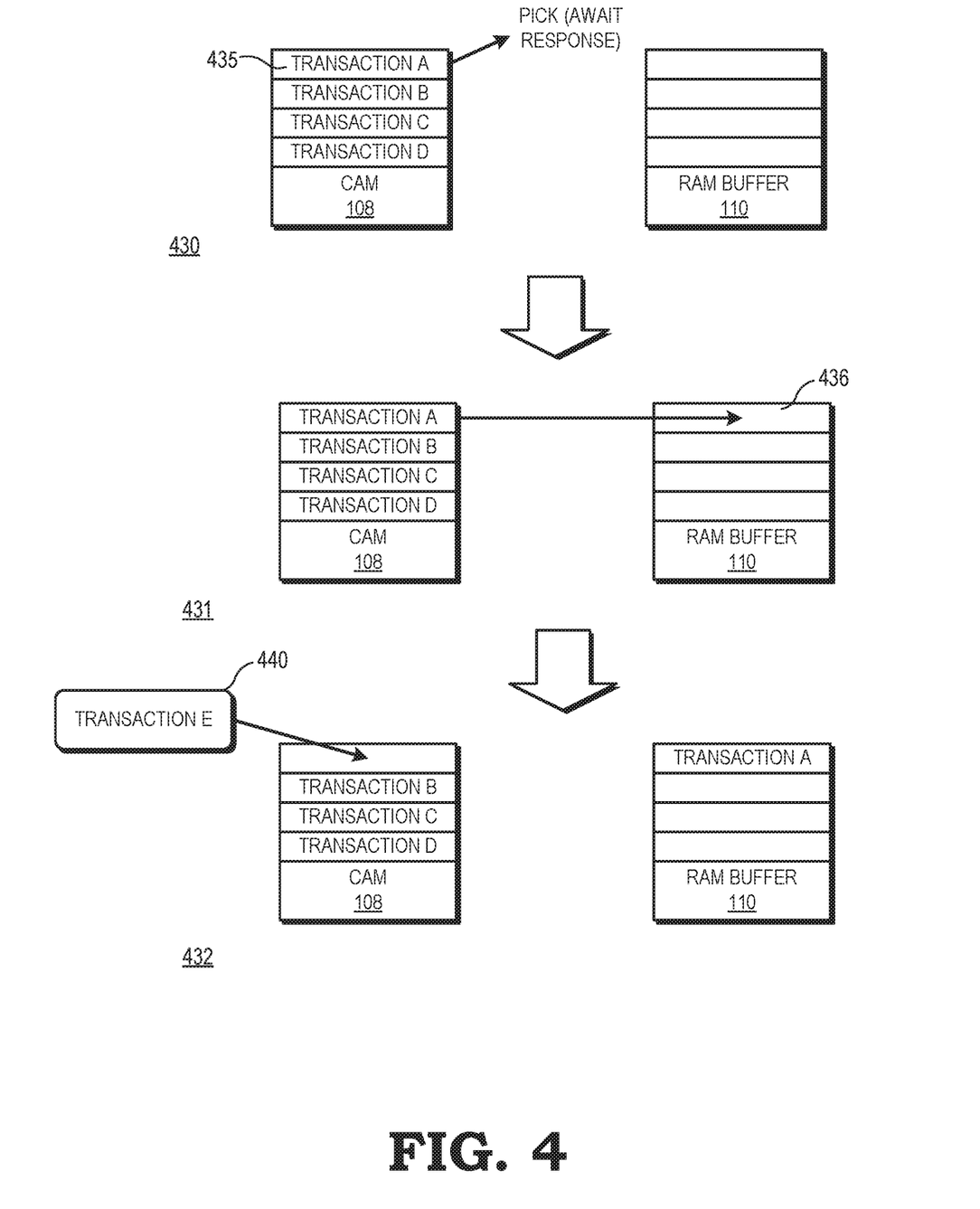
FIG. 4 is a diagram illustrating another example operation of the expandable memory buffer of FIG. 1 in accordance with some embodiments.

FIG. 4 illustrates an example of storing issued memory transactions at the RAM buffer 110 in accordance with some embodiments. In the depicted example, at time 430 a memory transaction, designated Transaction A, is selected by the picker 107 from an entry 435 of the CAM 108, and provides Transaction A to the memory 120. Transaction A thus becomes an issued transaction that is awaiting a response from the memory 120, such as read data, acknowledgement that a write has been completed, and the like. In response to Transaction A becoming an issued memory transaction, at time 431 the memory buffer 115 transfers Transaction A from entry 435 of the CAM 108 to an entry 436 of the RAM buffer 110, so that entry 435 becomes available to store a memory transaction.

At time 432 the scheduler 106 receives a memory transaction 440, designated Transaction E. In response, the scheduler 106 searches only the CAM 108 for matching entries, and omits a search of the RAM buffer 110. Based on the search, the scheduler 106 stores Transaction E at the available entry 435.

Figure 5:
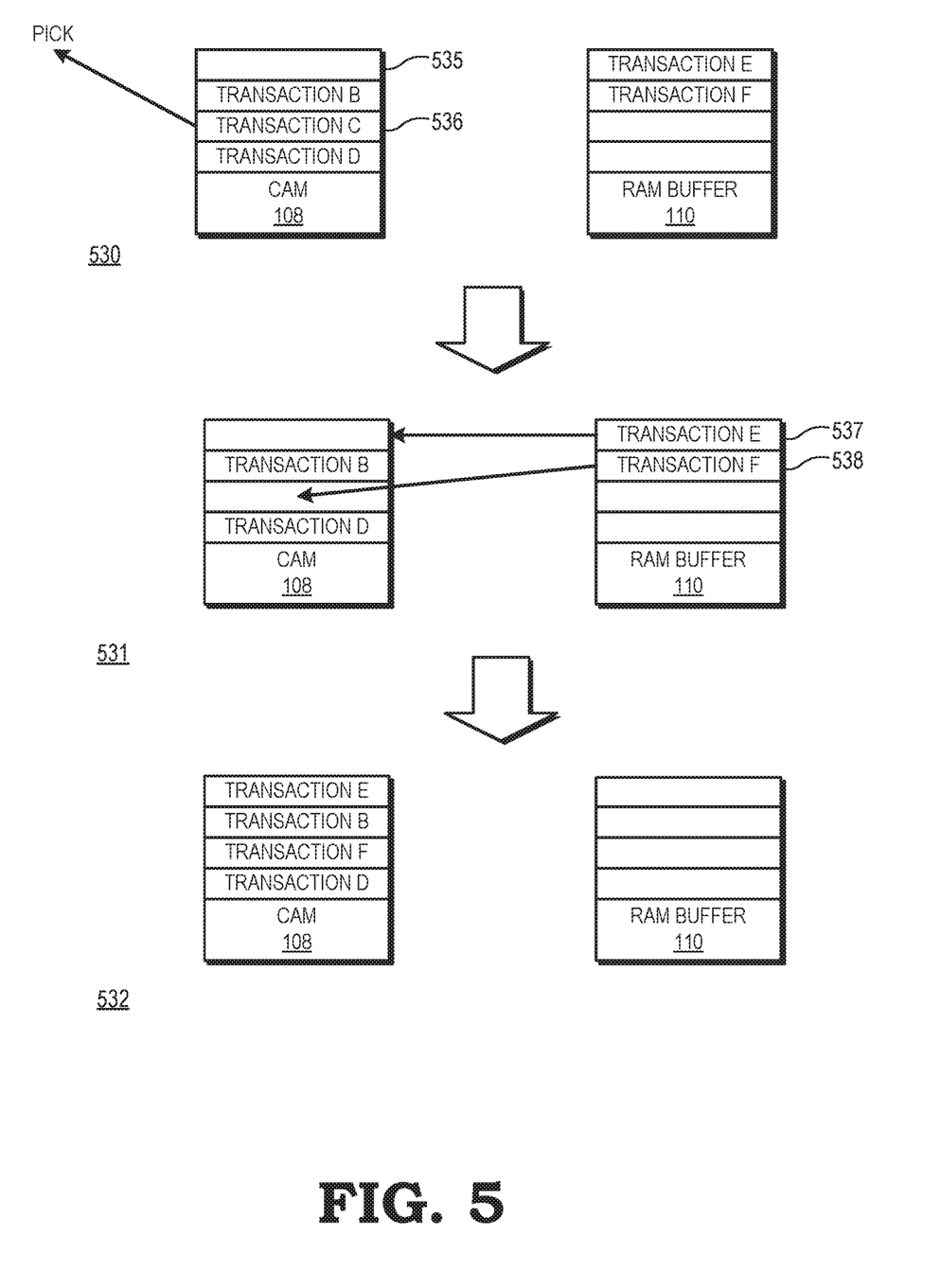
FIG. 5 is a diagram illustrating still another example operation of the expandable memory buffer of FIG. 1 in accordance with some embodiments.

In some embodiments, rather than restricting the RAM buffer to storing only issued memory transactions, the memory buffer 115 is configured to reduce the number of entries of the RAM buffer 110 that store memory transactions, by periodically transferring memory transactions from the RAM buffer 110 to the CAM 108. An example is illustrated at FIG. 5 in accordance with some embodiments. In the illustrated example, at a time 530 the picker 107 selects a memory transaction from an entry 536 of the CAM 108. As a result, two entries of the CAM 108, entries 535 and 536, are available to store memory transactions. The scheduler 106 determines that the number of available entries of the CAM 108 is at a threshold level (i.e. a threshold level of two entries). In response, at time 531 the scheduler 106 transfers two memory transactions, from entry 537 and entry 538 respectively of the RAM buffer 110, to entries 435 and 436 of the CAM 108. The transfer empties RAM buffer 110 of memory transactions, as illustrated at time 432. Accordingly, for a subsequently received memory transaction, the scheduler 106 only searches the CAM 108 for matching entries, improving memory access efficiency.

It will be appreciated that in some embodiments the scheduler 106 uses different criteria for initiating a transfer of memory transactions from the RAM buffer 110 to the CAM 108. For example, in some embodiments the scheduler 106 initiates a transfer in response to both the number of available entries of the CAM 108 exceeding a first threshold and the number of memory transactions stored at the RAM buffer 110 exceeding a second threshold different than the first threshold. Further, in some embodiments the scheduler 106 only transfers memory transactions to a subset of the available entries of the CAM 108, so that the CAM 108 still has some available entries to store memory transactions received from the processor core 102.

Figure 6:
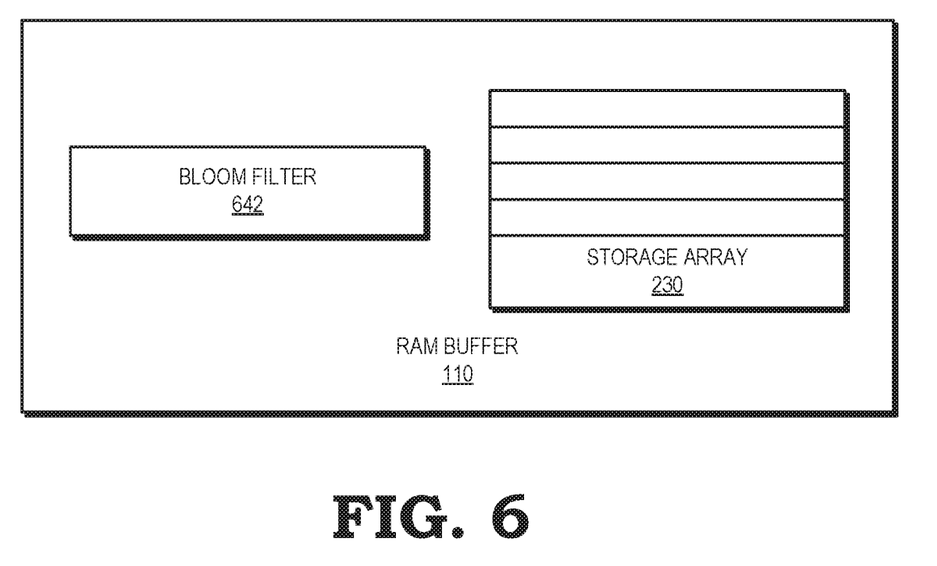
FIG. 6 is a block diagram of another example configuration of the expandable memory buffer of FIG. 1 in accordance with some embodiments.

In still other embodiments, the RAM buffer 110 is configured to support efficient searching of the storage array 230. FIG. 6 illustrates an example of the RAM buffer 110 including a Bloom filter 642 to support efficient searching of the storage array 230. The Bloom filter 642 includes a plurality of entries, with each entry associated with a memory address hash. In response to storing a memory transaction at the storage array 230, the RAM buffer 110 increments the entry of the Bloom filter 642 corresponding to the hashed memory address of the memory transaction. Further, in response to a memory transaction at the storage array 230 being picked and completed, the RAM buffer 110 decrements the corresponding entry of the Bloom filter 642.

In response to receiving a memory transaction, the scheduler 106 determines the value of the entry of the Bloom filter 642 corresponding to the hashed memory address of the received transaction. If the corresponding entry of the Bloom filter 642 is equal to zero, then there does not exist any prior request in the storage array 230 to the same address, and the scheduler 106 omits searching of the storage array 230. If the corresponding entry of the Bloom filter 642 is not zero, then a matching entry may or may not exist at the storage array 230. Accordingly, the scheduler 106 searches the storage array 230 for a matching entry. The Bloom filter 642 thus provides a relatively fast way to identify if the storage array 230 does not include matching entries for a received memory transaction, reducing transaction latency.

Figure 7:
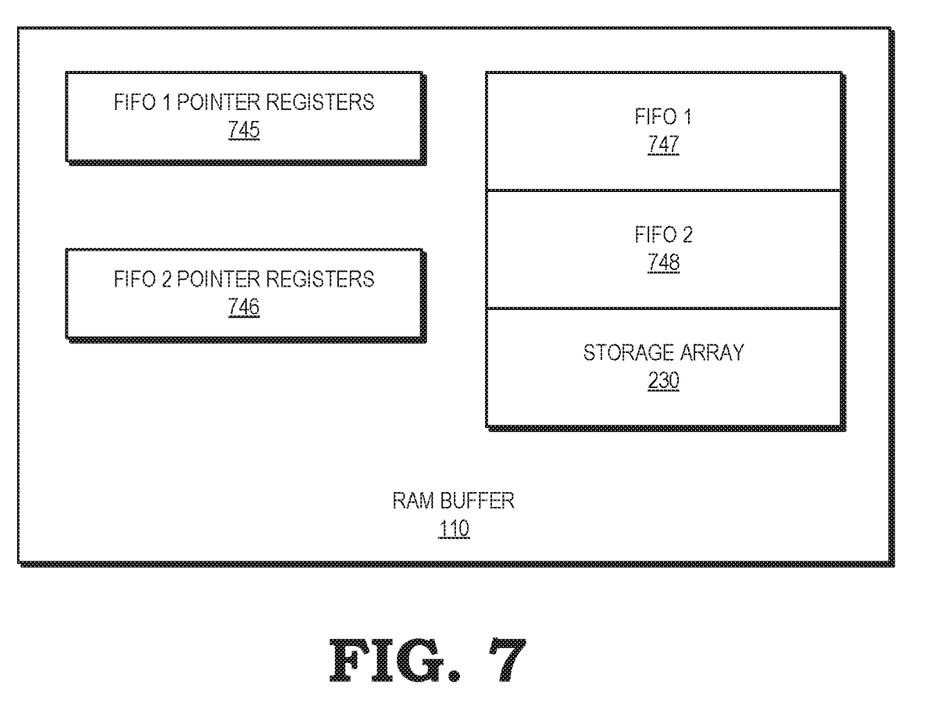
FIG. 7 is a block diagram of still another example configuration of the expandable memory buffer of FIG. 1 in accordance with some embodiments.

In other embodiments, the RAM buffer 110 is configured to reduce transaction latency by dividing the storage array 230 into N logical FIFOs, with each of the logical FIFOs associated with a different subset of memory addresses. An example, where N is equal to two, is illustrated at FIG. 7 in accordance with some embodiments. In the depicted example, the storage array 230 is divided into two logical FIFOs: a FIFO 747 (designated FIFO 1) and a FIFO 748 (designated FIFO 2). The RAM buffer 110 includes FIFO 1 pointer registers 745, which store head and tail pointers for the FIFO 747, and FIFO 2 pointer registers 746, which store head and tail pointers for FIFO 748.

In operation, the scheduler 106 and picker 107 manage the FIFOs 747 and 748 as independent FIFOs for memory transactions associated with different subsets of memory addresses. In response to receiving a memory transaction, the scheduler 106 identifies which of the FIFOs 747 and 748 is associated with the memory address of the received memory transaction. The scheduler 106 searches only the identified FIFO for a matching entry, and stores the received memory transaction at the identified FIFO based on the results of the search. Thus, for the embodiment of FIG. 7, the scheduler searches only one FIFO for matching entries, thereby reducing search time and reducing memory latency.

Figure 8:
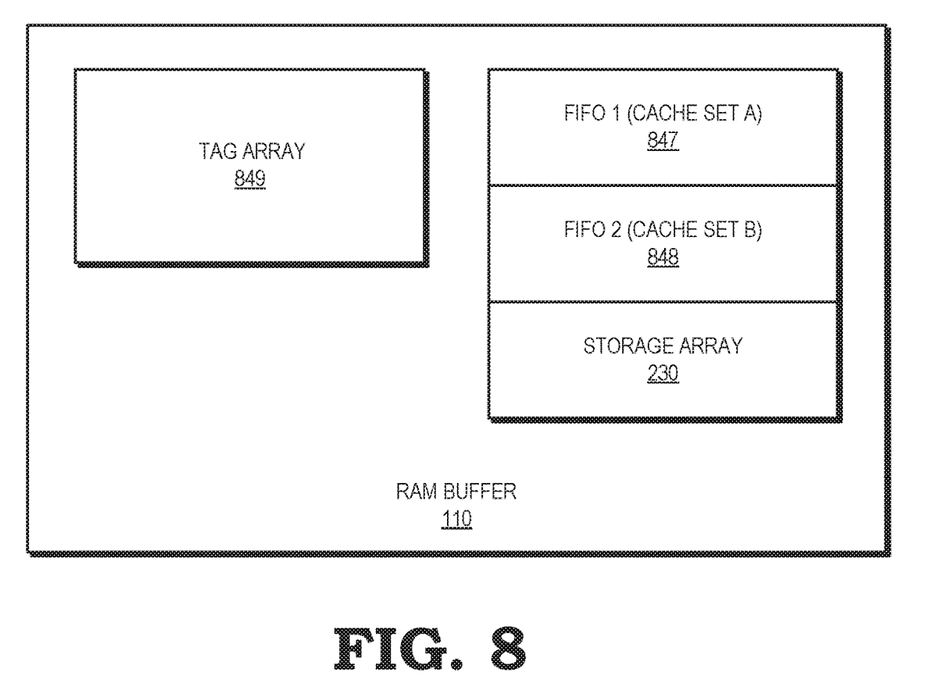
FIG. 8 is a block diagram of yet another example configuration of the expandable memory buffer of FIG. 1 in accordance with some embodiments.

In other embodiments, including the embodiment of FIG. 8, each logical FIFO of the RAM buffer 110 is configured as a cache. In the example of FIG. 8, the storage array 230 is logically divided into FIFOs 847 and 848, with each FIFO corresponding to a different cache set. The RAM buffer 110 includes a tag array 849 that stores address tags for the entries of the storage array 230, in similar fashion to a tag array for a cache. By configuring the RAM buffer 110 as a cache, the storage array 230 can be efficiently searched using cache probes. In particular, in response to receiving a memory transaction, the scheduler 106 accesses the tag array 849 to identify if the storage array 230 includes a matching entry. Because each FIFO is associated with a different set, searching the tag array 849 in this way effectively searches the FIFO associated with the received memory transaction. The configuration of FIG. 8 thus supports efficient searching of the storage array 230, reducing memory latency.

In some embodiments such as FIG. 8 where the RAM buffer 110 is configured as a cache, the storage array 230 stores not just memory transactions, but also data associated with the transactions, such as data to be written to the memory 120 or data that has been read from the memory 120. The RAM buffer 110 maintains the data at the storage array 230 for a period of time after the memory transaction has been serviced, so that subsequent read requests to the same memory address are satisfied directly from the storage array 230, rather than from the memory 120, thereby avoiding a memory access.

In yet other embodiments, wherein the memory management scheme does not require strict ordering of requests, the storage array 230 is organized as a set-associative cache-like structure where the scheduler 106 inserts new data into a set of the cache based on standard address indexing, and searches the cache using standard tag matching hardware.

In still other embodiments, the storage array 230 may be implemented using multiple-port entries. This allows a memory transaction to be stored at an entry concurrent with the entry being searched, improving throughput at the RAM buffer 110.

In yet other embodiments, the memory controller 105 is configured so that the RAM buffer 110 only stores memory access requests of a particular type as indicated, for example, by a field of the memory access request. For example, the scheduler 106 may only store latency tolerant requests at the RAM buffer 110, or may only store memory access requests having a priority below a threshold value.

Figure 9:
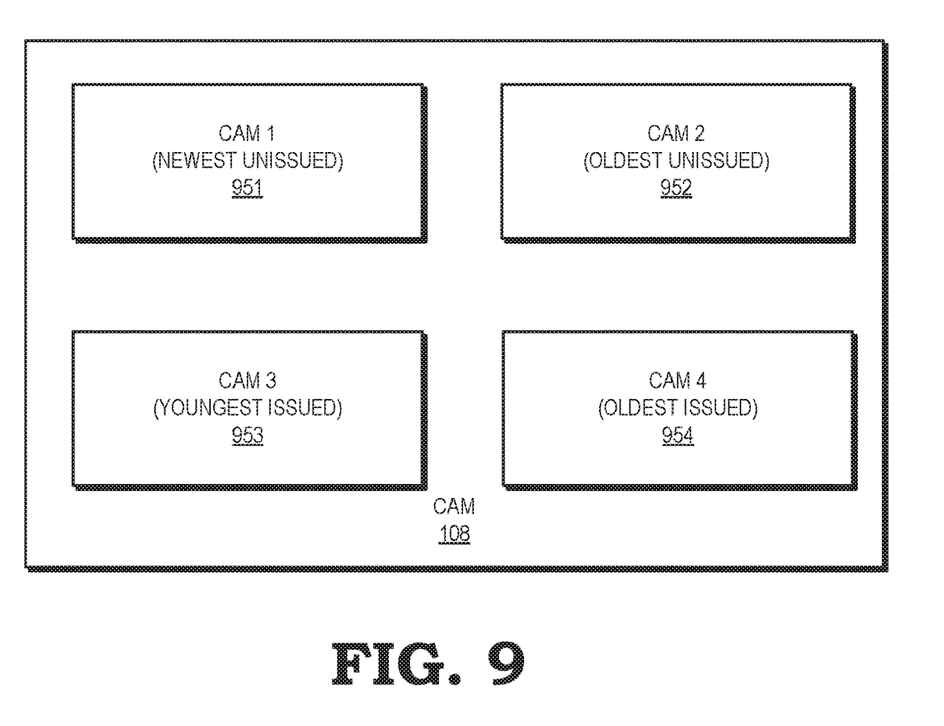
FIG. 9 is a block diagram of an example configuration of a content addressable memory (CAM) of the processing system of FIG. 1 in accordance with some embodiments.

Under some memory management schemes, the scheduler 106 repeatedly searches for memory transactions according to a memory transaction type or characteristic. Examples of such searches include searching recently received memory transactions, or searching issued memory transactions that are awaiting a response from the memory 120. Accordingly, in some embodiments, the memory controller 105 is configured to improve memory access efficiency by implementing the CAM buffer 108 as multiple separate buffers, with each buffer designated to store memory transactions of a different type. Such a configuration allows the scheduler 106 to implement different searches by searching only the CAM buffer corresponding to the search type, thereby reducing search time and improving memory transaction latency. An example of implementing the CAM buffer 108 as multiple buffers is illustrated at FIG. 9 in accordance with some embodiments.

In the depicted example, the CAM 108 is partitioned into four sections, designated CAM 951, CAM 952, CAM 953, and CAM 954. For the example of FIG. 9, CAM 951 stores the newest (i.e. the most recently received) memory transactions that have not yet been issued, CAM 952 stores the oldest (i.e. the least recently received) memory transactions that have not yet been issued, CAM 953 stores the youngest (i.e. the most recently) issued memory transactions, and CAM 954 stores the oldest (i.e. the least recently) issued memory transactions.

In operation, when CAM 951 has space (free entries), the scheduler 106 stores received memory transactions at CAM 951. If CAM 951 is full but CAM 952 has a free entry, the scheduler 106 moves memory transactions from CAM 951 to CAM 952 to free space at CAM 951 for received memory transactions. In some embodiments, the scheduler 106 maintains a counter (not shown) that tracks the total number of unissued requests held in the RAM buffer 110. When an entry becomes available in CAM 952 and the counter is non-zero, the scheduler 106 moves memory transactions from the RAM buffer 110 to CAM 952.

When the picker 107 selects a memory transaction, the picker 107 moves the selected transaction from CAM 952 to CAM 953. When CAM 954 has space, the picker 107 transfers memory transactions from CAM 953 to CAM 954. In some embodiments the picker moves requests directly from CAM 952 to CAM 954 after being picked and issued from CAM 952 if CAM 953 is empty and CAM 954 has room. When CAM 954 is full, the scheduler 106 moves memory transactions from CAM 954 to the RAM buffer 110. In some embodiments, the scheduler 106 maintains a counter (not shown) that tracks the number of memory transactions at CAM 954. When the counter indicates there is available space at the CAM 954, the scheduler 106 transfers memory transactions from the RAM buffer 110 back to the CAM 954.

In several of the embodiments described above, memory transactions are moved between the CAM 108 and the RAM buffer 110. Accordingly, in some embodiments, the memory controller 105 includes an auxiliary index table (not shown) that stores transaction identifiers, memory addresses, or a combination thereof, for the memory transactions stored at the CAM 108 and the RAM buffer 110. The index table also stores the current location of each memory transaction. When the scheduler 106 or the picker 107 moves a request from one location to another, this index table is updated to reflect the new location. In other embodiments, the memory transactions are connected in age-order using hardware linked lists. For example, in some embodiments each stored memory transaction contains an index to the next older request and one to the previous younger request. Storing the memory transactions as linked lists allows the scheduler 106 and the picker 107 to quickly traverse requests in age order if desired.

Figure 10:
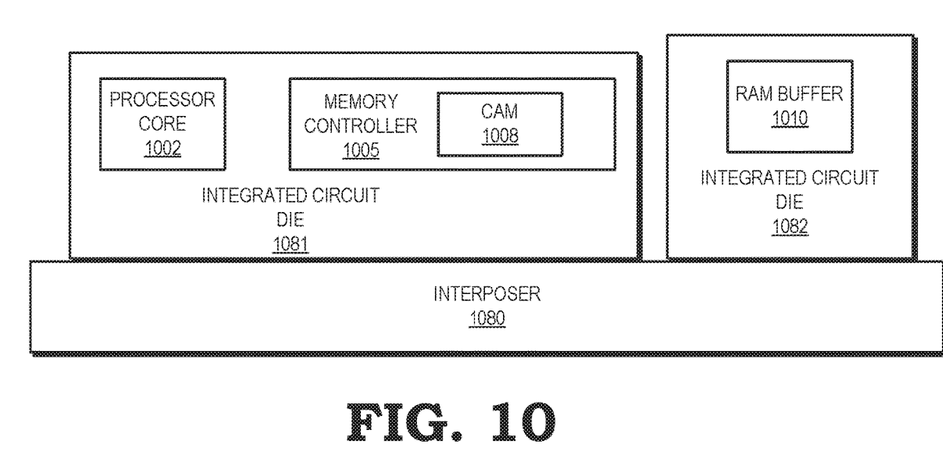
FIG. 10 is a block diagram illustrating an example integrated circuit die configuration of the processing system of FIG. 1 in accordance with some embodiments.
Figure 11:
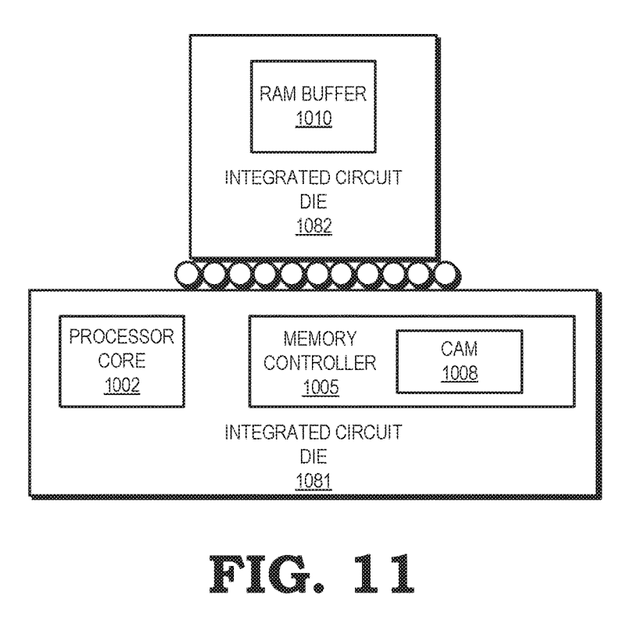
FIG. 11 is a block diagram illustrating another example integrated circuit die configuration of the processing system of FIG. 1 in accordance with some embodiments.

In some embodiments the RAM buffer 110 is placed on a different semiconductor die than other modules of the memory controller 105, such as the CAM 108, the picker 107, and the scheduler 106. This allows the memory controller 105 to be flexibly and inexpensively used with different processor configurations, including configurations that omit the RAM buffer 110. Examples of such configurations are illustrated at FIGS. 10 and 11. In the example of FIG. 10, a processor core 1002 and memory controller 1005 (including a CAM 1008) are formed as part of an integrated circuit (IC) die 1081. A RAM buffer 1010, similar to the RAM buffer 110, is formed as part of an IC die 1082. The IC dies 1081 and 1082 are mounted on an interposer 1080 that provides electrical coupling between the memory controller 1005 and the RAM buffer 1010. In the example of FIG. 11, the IC dies 1081 and 1082 are arranged in stacked die arrangement. In operation, the memory controller 1005 employs the CAM 1008 and the RAM buffer 1010 as an expandable buffer to store memory transactions according to any of the embodiments described above.

Figure 12:
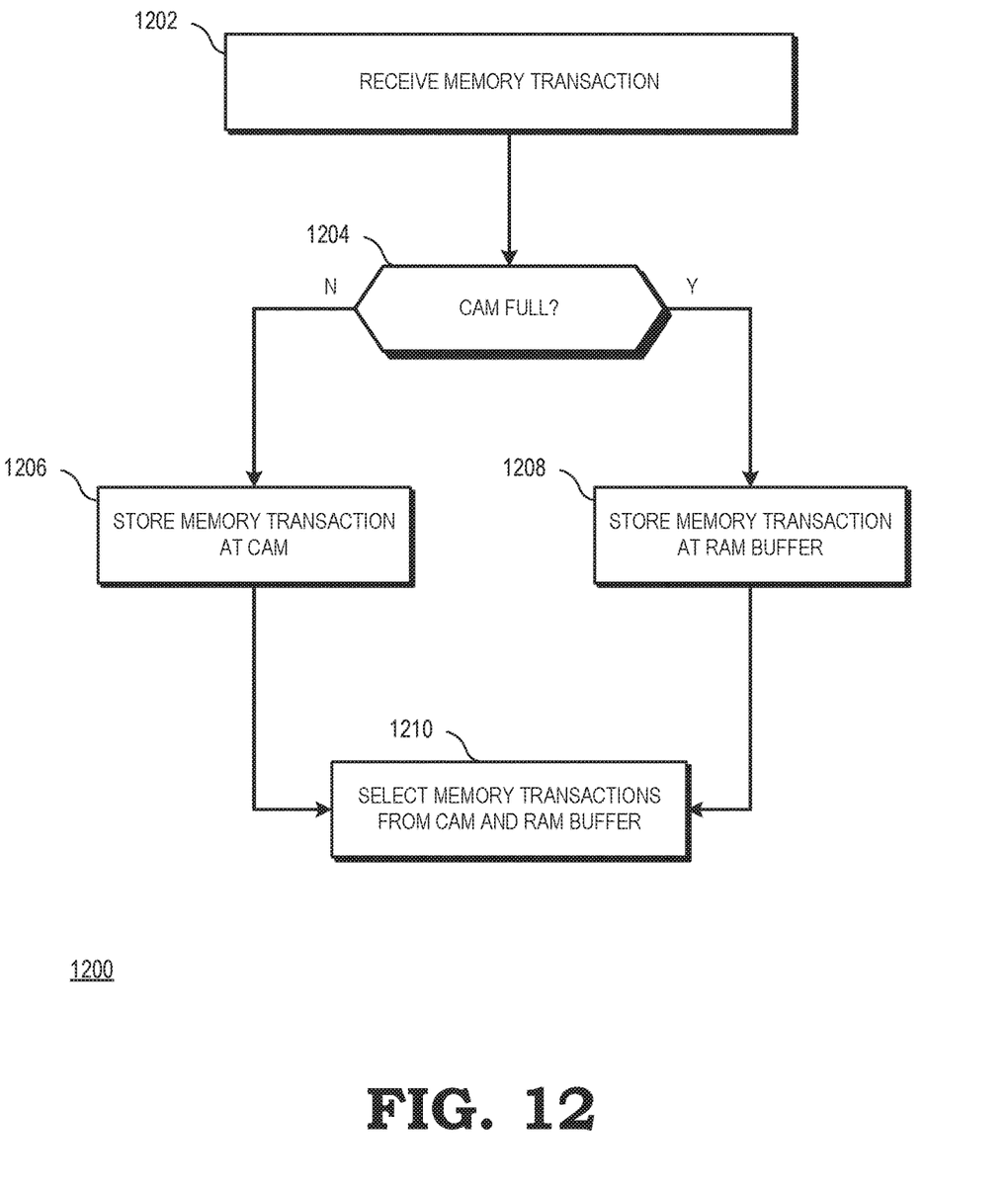
FIG. 12 is a flow diagram of a method of employing the expandable memory buffer of FIG. 1 in accordance with some embodiments.

FIG. 12 is a flow diagram of a method 1200 of managing an expandable memory buffer in accordance with some embodiments. The method 1200 is described with respect to an example implementation at the processing system 100 of FIG. 1. At block 1202 the scheduler 106 receives a memory transaction. In response, at block 1204 the scheduler 106 identifies if the CAM 108 is full (i.e. there are no entries at the CAM 108 available to store the received memory transaction). If not, the method flow moves to block 1206 and the scheduler 106 stores the received memory transaction at the CAM 108. The method flow proceeds to block 1210, described below.

Returning to block 1204, if the CAM 108 is full, the method flow proceeds to block 1208 and the scheduler 106 stores the memory transaction at the RAM buffer 110. The method flow proceeds to block 1210, and the picker 107 selects memory transactions from the CAM 108 and the RAM buffer 110 according to the memory management scheme.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   storing a first memory transaction at a content addressable memory (CAM) associated with a memory controller;
   storing a second memory transaction at a random access memory (RAM) buffer associated with the memory controller; and
   selecting memory transactions from the CAM and the RAM buffer to provide to a memory, wherein the RAM buffer is distinct from the CAM.

2. The method of claim 1, wherein storing the second memory transaction comprises storing the second memory transaction at the RAM buffer in response to determining the CAM has no available entries to store memory transactions.

3. The method of claim 1, wherein selecting memory transactions comprises selecting the second memory transaction from the RAM buffer in response to determining that the CAM is empty of any valid memory transactions.

4. The method of claim 1, further comprising:
   in response to receiving a third memory transaction at the memory controller, searching the CAM and the RAM buffer for memory transactions that target a same memory address as the third memory transaction.

5. The method of claim 4, wherein searching comprises:
   searching the CAM for memory transactions that target the same memory address as the third memory transaction; and
   searching the RAM buffer in response to determining that the CAM is empty of memory transactions that target the same memory address as the third memory transaction.

6. The method of claim 4, wherein searching the RAM buffer comprises:
   searching the RAM buffer in a sequential order; and
   terminating searching the RAM buffer in response to identifying an entry of the RAM buffer that stores a memory transaction targeting the same address as the third memory transaction.

7. The method of claim 4, further comprising:
   maintaining a count of memory transactions stored at the RAM buffer; and
   wherein searching comprises searching the RAM buffer in response to determining that the count of memory transactions stored at the RAM buffer is greater than a threshold number.

8. The method of claim 7, wherein maintaining the count comprises maintaining a Bloom filter based on hashes of memory transactions stored at the RAM buffer.

9. The method of claim 4, wherein searching comprises: searching a tag array associated with the RAM buffer, the tag array storing tags of memory addresses corresponding to memory transactions stored at the RAM buffer.

10. The method of claim 4, wherein:
the RAM buffer comprises a multiport RAM; and
searching comprises concurrently searching an entry of the RAM buffer and storing data at the RAM buffer.

11. The method of claim 1, wherein storing the second memory transaction comprises transferring the second memory transaction from the CAM to the RAM buffer.

12. The method of claim 11, wherein transferring the second memory transaction comprises transferring the second memory transaction based on a priority of the second memory transaction and a priority of the first memory transaction.

13. A method, comprising:
storing a first memory transaction at a first content addressable memory (CAM) associated with a memory controller;
storing a second memory transaction at a random access memory (RAM) buffer associated with the memory controller;
in response to determining a second CAM associated with the memory controller has an available entry, transferring the first memory transaction from the first CAM to a second CAM; and
selecting memory transactions from the second CAM to provide to a memory.

14. The method of claim 13, further comprising:
in response to transferring the first memory transaction from the first CAM to the second CAM, transferring the second memory transaction from the RAM buffer to the first CAM.

15. The method of claim 14, further comprising:
in response to selecting the first memory transaction from the second CAM, transferring the first memory transaction from the second CAM to a third CAM.

16. The method of claim 15, wherein transferring the first memory transaction to the third CAM comprises:
in response to determining that the third CAM does not have an available entry to store the first memory transaction, transferring a third memory transaction from the third CAM to the RAM buffer.

17. A processor, comprising:
a processor core to generate a first memory transaction and a second memory transaction;
a memory controller comprising:
a content addressable memory (CAM);
a random access memory (RAM) buffer;
a scheduler to:
store the first memory transaction at the CAM;
store the second memory transaction at the RAM buffer; and
a picker to select memory transactions from the CAM and the RAM buffer to provide to a memory, wherein the RAM buffer is distinct from the CAM.

18. The processor of claim 17, wherein the scheduler is to store the second memory transaction at the RAM buffer in response determining the CAM has no available entries to store memory transactions.

19. The processor of claim 17, wherein the picker is to select the second memory transaction from the RAM buffer in response to determining that the CAM is empty of any valid memory transactions.

20. The processor of claim 17, wherein:
the processor is to generate a third memory transaction; and
the scheduler is to, in response to receiving the third memory transaction at the memory controller, search the CAM and the RAM buffer for memory transactions that target a same memory address as the third memory transaction.

* * * * *